(12) United States Patent
Inakoshi

(10) Patent No.: US 8,543,989 B2
(45) Date of Patent: Sep. 24, 2013

(54) PROGRAM EVALUATION APPARATUS AND PROGRAM EVALUATION METHOD

(75) Inventor: Hiroya Inakoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 993 days.

(21) Appl. No.: 12/573,661

(22) Filed: Oct. 5, 2009

(65) Prior Publication Data

US 2010/0088682 A1 Apr. 8, 2010

(30) Foreign Application Priority Data

Oct. 7, 2008 (JP) .................................. 2008-260389

(51) Int. Cl.
*G06F 9/44* (2006.01)
(52) U.S. Cl.
USPC ........................................................ 717/130
(58) Field of Classification Search
None
See application file for complete search history.

(56) References Cited

U.S. PATENT DOCUMENTS

| 6,374,367 | B1 | 4/2002 | Dean et al. | |
|---|---|---|---|---|
| 6,718,286 | B2* | 4/2004 | Rivin et al. | 702/186 |
| 2005/0086022 | A1* | 4/2005 | Lindberg et al. | 702/123 |
| 2006/0015612 | A1 | 1/2006 | Shimazaki et al. | |
| 2008/0134148 | A1* | 6/2008 | Clark | 717/128 |

FOREIGN PATENT DOCUMENTS

| JP | 1-145736 A | 6/1989 |
|---|---|---|
| JP | 9-34754 A | 2/1997 |
| JP | 11-272519 A | 10/1999 |
| JP | 3389745 B | 1/2003 |
| JP | 2005-346414 A | 12/2005 |

\* cited by examiner

*Primary Examiner* — Henry Tsai
*Assistant Examiner* — Juanito Borromeo
(74) *Attorney, Agent, or Firm* — Fujitsu Patent Center

(57) ABSTRACT

An apparatus for evaluating a performance of a program includes: a storage unit for storing the program embedded with a plurality of trace statements; a processor executes a process including: executing the program embedded with a plurality of trace statements cyclically; calculating each time intervals of each cycle of execution of the program from a start test program till an end program; and evaluating the performance of the program on the basis of information of the time intervals.

10 Claims, 17 Drawing Sheets

FIG. 2

```
MEASURED PROGRAM func baz()
  begin
      :                    ↓ W2
  end func bar()
  begin
      :
      TRACE SENTENCE M1 ↓ W1
      baz()
      TRACE SENTENCE M2  ↓ W3
      :
  end func foo()
  begin
      :
      TRACE SENTENCE M0
      bar()
      TRACE SENTENCE M3
      :
  end
```

FIG. 4A

|   | TIME | LABEL |
|---|------|-------|
| 0 | 1200 | M2 |
| 1 | 1320 | M3 |
| 2 | 1480 | M1 |
| 3 | 1520 | M1 |
| 4 | 1790 | M3 |
| 5 | 2100 | M2 |
| 6 | 2190 | M0 |
| 7 | 2320 | M2 |
|   | ⋮ | ⋮ |

FIG. 4B

| No. (i) | TIME LAG (Ti) | START LABEL (Bi) | END LABEL (Ei) |
|---------|---------------|------------------|----------------|
| 1 | 120 | M2 | M3 |
| 2 | 160 | M3 | M1 |
| 3 | 160 | M1 | M1 |
| 4 | 170 | M1 | M3 |
| 5 | 320 | M3 | M2 |
| 6 | 90  | M2 | M0 |
| 7 | 130 | M0 | M2 |
| ⋮ | ⋮ | ⋮ | ⋮ |

FIG. 4C

| No. (i±) | INDEX + | INDEX − | TIME LAG (Ti±) | v | u |
|----------|---------|---------|----------------|---|---|
| 1± | 5 | 1   | 440 | M2 | M3 |
| 2± | 2 | 4   | 330 | M1 | M3 |
| 3± | 3 | nil | 160 | M1 | M1 |
| 4± | 6 | 7   | 220 | M0 | M2 |
| ⋮ | ⋮ | ⋮ | ⋮ | ⋮ | ⋮ |

FIG. 5A

| TIME | LABEL | TRACE COUNTER VALUE |
|---|---|---|
| 0 | 1200 | M2 | 1000 |
| 1 | 1320 | M3 | 1049 |
| 2 | 1480 | M1 | 1116 |
| 3 | 1520 | M1 | 1184 |
| 4 | 1790 | M3 | 1254 |
| 5 | 2100 | M2 | 1389 |
| 6 | 2190 | M0 | 1427 |
| 7 | 2320 | M2 | 1481 |
| : | : | : | : |

FIG. 5B

| No. (i) | TIME LAG (Ti) | START LABEL (Bi) | END LABEL (Ei) | HIDDEN TRACE NUMBER (ki) |
|---|---|---|---|---|
| 1 | 120 | M2 | M3 | 49 |
| 2 | 160 | M3 | M1 | 67 |
| 3 | 160 | M1 | M1 | 68 |
| 4 | 170 | M1 | M3 | 70 |
| 5 | 320 | M3 | M2 | 135 |
| 6 | 90 | M2 | M0 | 38 |
| 7 | 130 | M0 | M2 | 54 |
| : | : | : | : | : |

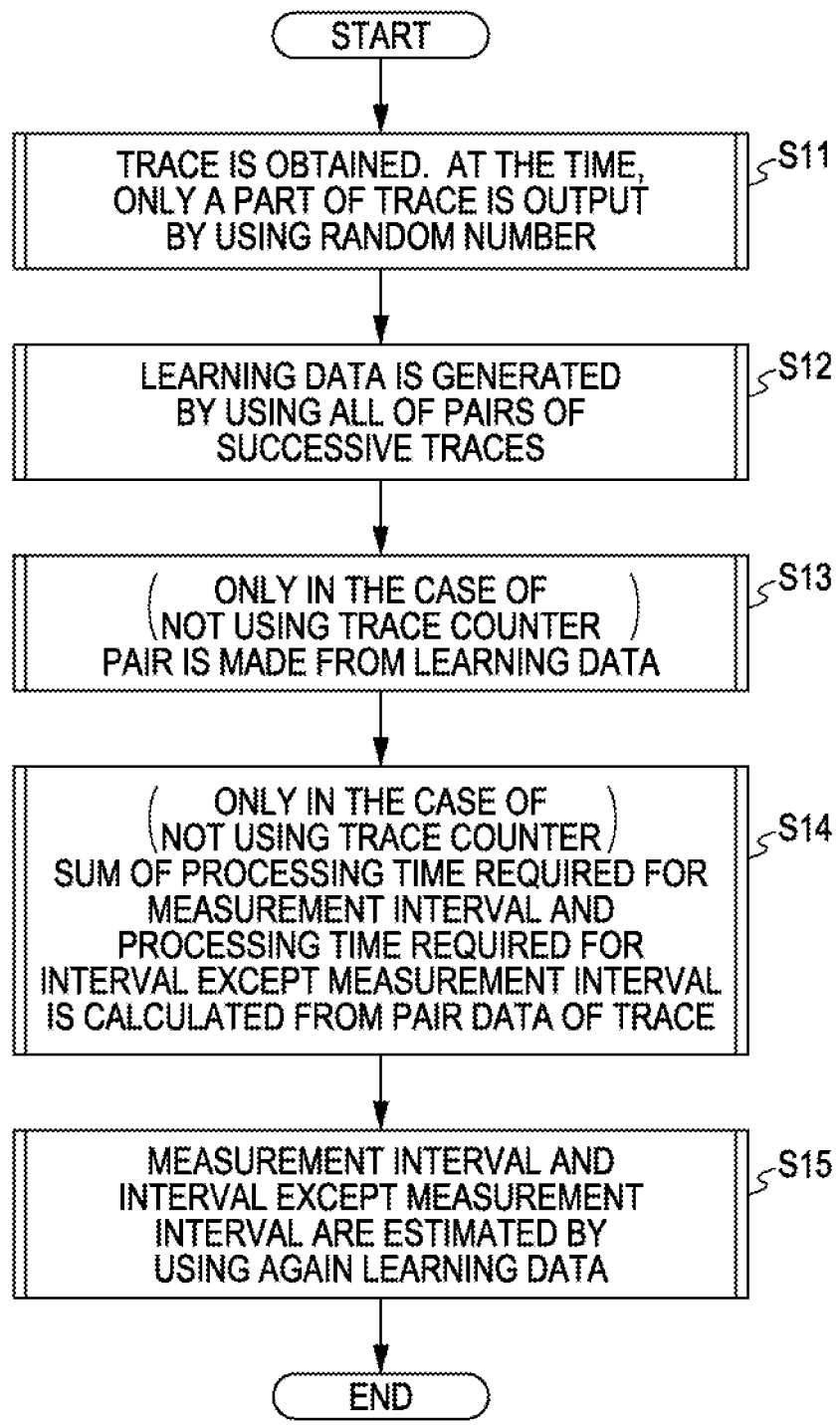

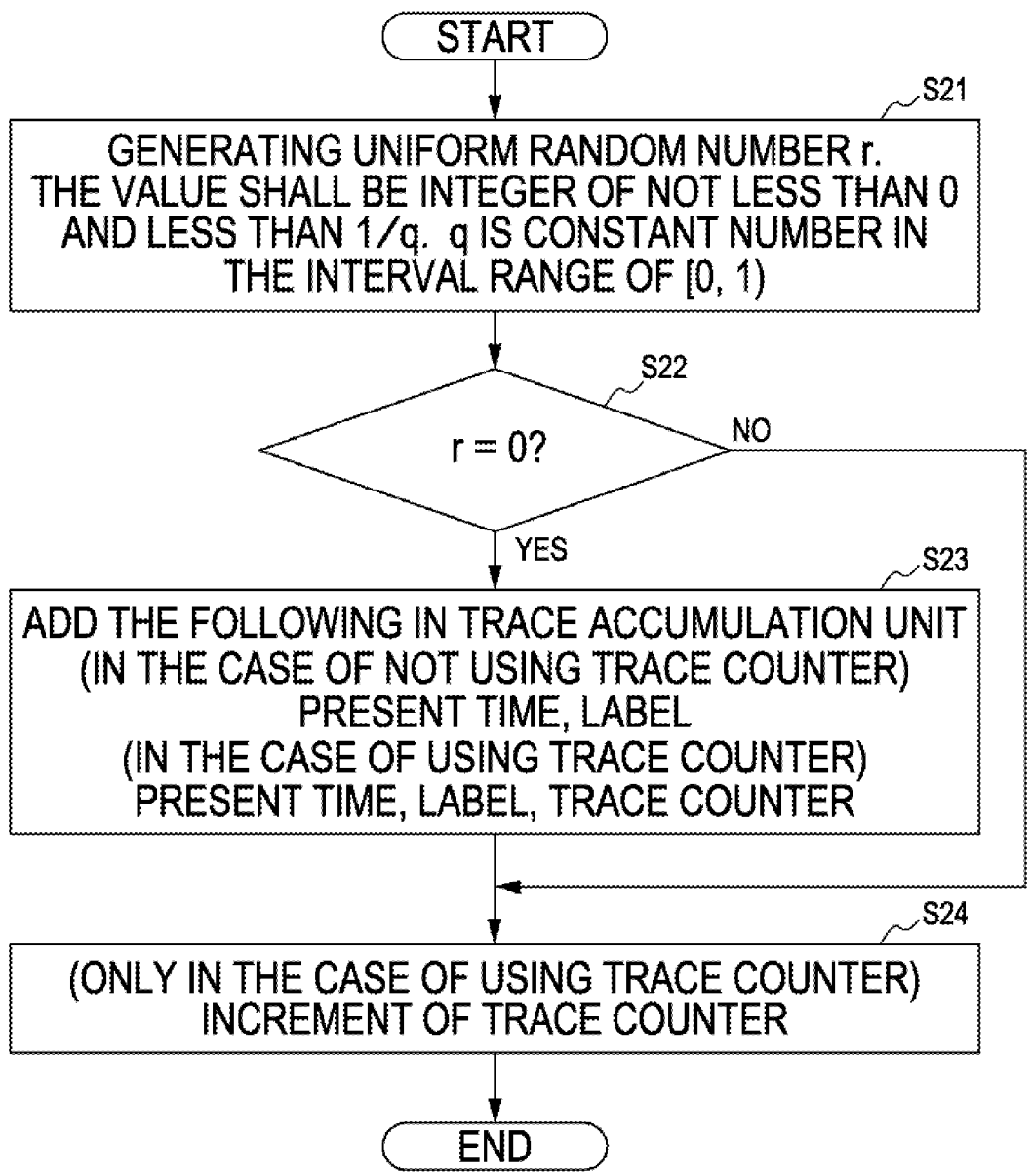

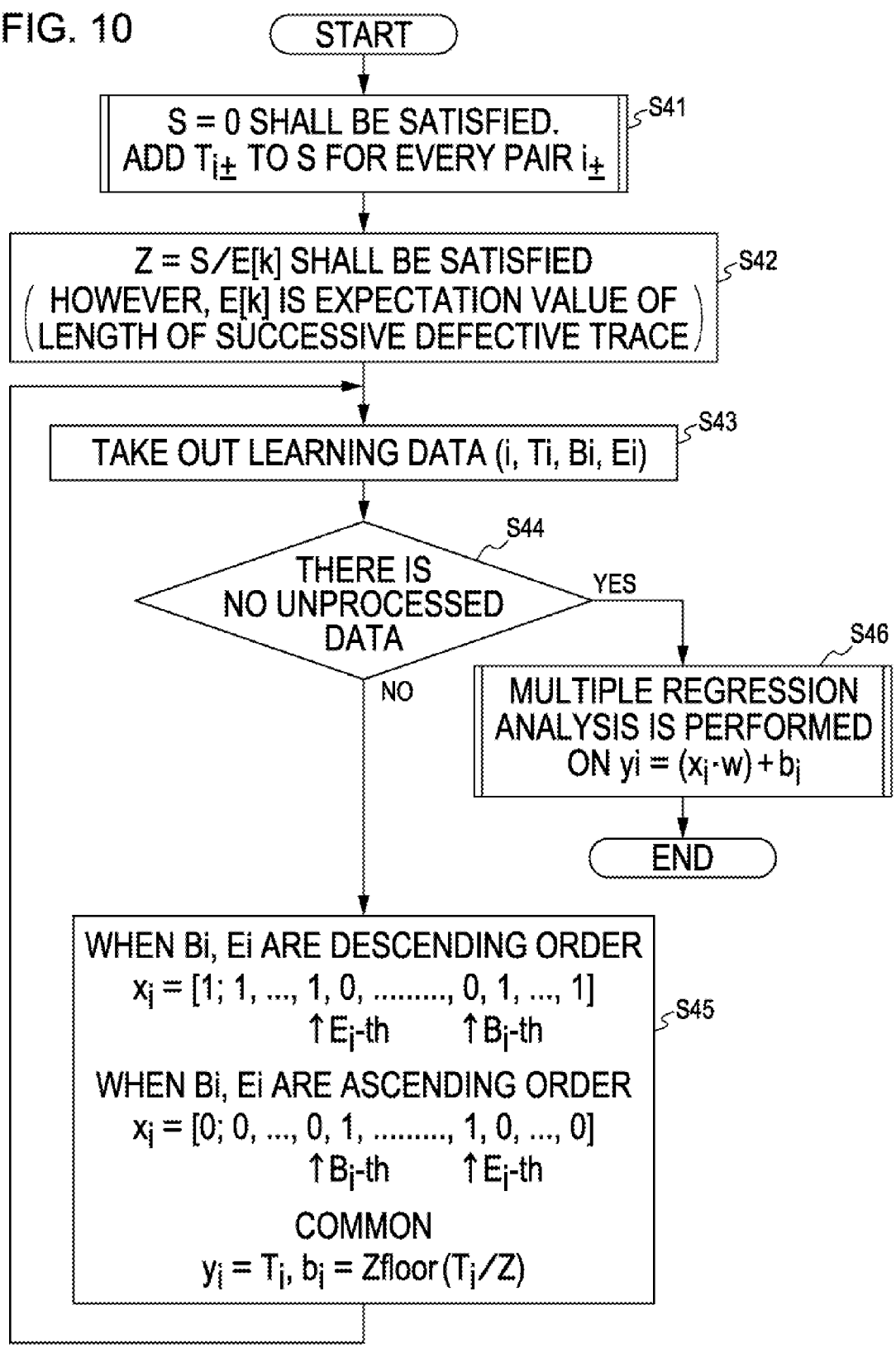

FIG. 11

- IN THE CASE OF $u \geq v$ $$T_{i+} = \overbrace{(W_{u+1} + \ldots + W_S) + (W_0 + \ldots + W_S) + \ldots + (W_0 + \ldots + W_S) + \underbrace{(W_0 + W_1 + \ldots + W_v)}}^{k_{i+}} \\ (S+1) - (u-v)$$

- IN THE CASE OF $u < v$ $$T_{i-} = \overbrace{(W_{v+1} + \ldots + W_S) + (W_0 + \ldots + W_S) + \ldots + (W_0 + \ldots + W_S) + \underbrace{(W_0 + W_1 + \ldots + W_u)}}^{k_{i-}} \\ (S+1) + (u-v)$$

(i) ADD LEFT PARTS AND ADD RIGHT PARTS OF THE ABOVE TWO FORMULAS
$T_{i+} + T_{i-} = Z\{k_{i+} + k_{i-}\}/(S+1) = Z\{\sum_\pi k_{i\pm}\}/(S+1) = Zc_{i\pm}$,
where $Z = W_0 + \ldots + W_S$, $c_{i\pm} = \{k_{i+} + k_{i-}\}/(S+1)$ (ii) ADD FORMULA (i) FOR EVERY PAIR DATA ASSEMBLY $\pi$
$\sum_\pi T_{i\pm} = Z\sum_\pi c_{i\pm} = Z\{\sum_\pi k_{i\pm}\}/(S+1)$
$Z = (S+1)\sum_\pi T_{i\pm}/\sum_\pi k_{i\pm}$
$\sim (S+1)\sum_\pi T_{i\pm}/\sigma E[k]$, where $\sigma = \sum_\pi 1$ NOTE THAT "~" SHALL MEAN THAT LEFT PART AND RIGHT PART BECOMES CLOSE WHEN PAIR DATA ASSEMBLY $\pi$ IS SUFFICIENTLY LARGE FIG. 12A    $p(k) = (1-q)^k q$ FIG. 12B
$P(X \geq k) = p(k) + p(k+1) + \ldots = (1-q)^k$
$P(X \geq k+1) = p(k+1) + p(k+2) + \ldots = (1-q)^{k+1}$
$\therefore p(k) = P(X \geq k) - P(X \geq k+1) = (1-q)^k - (1-q)^{k+1} = (1-q)^k q$ FIG. 12C    $E[k] = \Sigma k p(k) = q/(1-q)^2$ FIG. 12D
WHEN $q = 1/2$, $E[k] = 2$
WHEN $q = 1/3$, $E[k] = 6$
WHEN $q = 1/4$, $E[k] = 12$
WHEN $q = 1/5$, $E[k] = 20$

FIG. 13

- IN THE CASE OF $u \geq v$ $$T_{i+} = \overbrace{(W_{u+1} + \ldots + W_S) + (W_0 + \ldots + W_S) + \ldots + (W_0 + \ldots + W_S) + (W_0 + W_1 + \ldots + W_v)}^{k_{i+}}$$

$$\underbrace{\phantom{(S+1)}}_{(S+1) - (u-v)}$$

$= (W_0 + W_1 + \ldots + W_S) + (W_{u+1} + \ldots + W_S) + Z\{k_{i+} - (S+1) + (u-v)\} / (S+1)$ $\sim (W_0 + W_1 + \ldots + W_S) + (W_{u+1} + \ldots + W_S) + Zfloor(T_{i+}/Z)$ $= [1\ 1\ \ldots\ 1\ 0\ \ldots\ 0\ 1\ \ldots\ 1]^t [W_0\ W_1\ \ldots\ W_v\ W_{v+1}\ \ldots\ W_u\ W_{u+1}\ \ldots\ W_S] + Zfloor(T_{i+}/Z)$ $= (x_{i+} \cdot t_w) + Zfloor(T_{i+}/Z)$ ∴ $\{k_{i+} - (S+1) + (u-v)\} / (S+1)$ IS APPEARANCE NUMBER OF S+1 LABEL LINE FROM $M_0$ TO $M_S$. THIS IS NUMBER OF $Z = W_0 + \ldots + W_S$ WHICH CAN BE ENTERED DURING TIME INTERVAL $T_{i+}$

- IN THE CASE OF $u < v$ $$T_{i-} = \overbrace{(W_{v+1} + \ldots + W_S) + (W_0 + \ldots + W_S) + \ldots + (W_0 + \ldots + W_S) + (W_0 + W_1 + \ldots + W_u)}^{k_{i-}}$$

$$\underbrace{\phantom{(S+1)}}_{(S+1) + (u-v)}$$

$= (W_0 + W_1 + \ldots + W_S) + (W_{v+1} + \ldots + W_S) + Z\{k_{i-} - (S+1) - (u-v)\} / (S+1)$ $\sim (W_0 + W_1 + \ldots + W_S) + (W_{v+1} + \ldots + W_S) + Zfloor(T_{i-}/Z)$ $= [0\ 0\ \ldots\ 0\ 1\ \ldots\ 1\ 0\ \ldots\ 0]^t [W_0\ W_1\ \ldots\ W_v\ W_{v+1}\ \ldots\ W_u\ W_{u+1}\ \ldots\ W_S] + Zfloor(T_{i-}/Z)$ $= (x_{i-} \cdot t_w) + Zfloor(T_{i-}/Z)$ ∴ BY THE SIMILAR CONSIDERATION IN THE CASE OF $u \geq v$ FIG. 14A $\quad E[k] = 120$ FIG. 14B
$S = 440 + 330 + 160 + 220 = 1150$
$Z = S/E[k] = 1150/120 = 9.58 ...$ FIG. 14C
IN THE CASE OF LEARNING DATA (1, 120, M2, M3):
M2, M3 ARE ASCENDING ORDER
$x1 = [0; 0, 0, 1], y1 = 120, b1 = 115.0$ FIG. 14D
IN THE CASE OF LEARNING DATA (2, 160, M3, M1):
M3, M1 ARE DESCENDING ORDER
$x2 = [1; 1, 0, 0], y2 = 160, b2 = 153.3$ FIG. 14E
IN THE CASE OF 3±) PAIR (3, 3):
M1, M1 ARE DESCENDING ORDER
$x3 = [1; 1, 1, 1], y3 = 160, b3 = 153.3$
:

FIG. 14F $$y = \begin{pmatrix} 120 \\ 160 \\ 160 \\ 170 \\ 320 \\ 90 \\ 130 \\ \vdots \end{pmatrix} \quad X = \begin{pmatrix} 0 & 0 & 0 & 1 \\ 1 & 1 & 1 & 0 \\ 1 & 1 & 1 & 1 \\ 0 & 0 & 1 & 1 \\ 1 & 1 & 1 & 0 \\ 1 & 0 & 0 & 1 \\ 0 & 1 & 1 & 0 \\ & \vdots & & \end{pmatrix} \begin{matrix} x1 \\ x2 \\ x3 \\ x4 \\ x5 \\ x6 \\ x7 \end{matrix} \quad b = \begin{pmatrix} 115.0 \\ 153.3 \\ 153.3 \\ 162.9 \\ 316.1 \\ 86.2 \\ 124.5 \\ \vdots \end{pmatrix}$$

FIG. 16

- IN THE CASE OF $u \geq v$ $$T_{i+} = \underbrace{(W_{u+1} + \ldots + W_S) + (W_0 + \ldots + W_S) + \ldots + (W_0 + \ldots + W_S)}_{k_{i+}} + \underbrace{(W_0 + W_1 + \ldots + W_v)}_{(S+1) - (u-v)}$$

$$= [n+1, \ldots, n+1, n, \ldots, n, n+1, \ldots, n+1]^t [W_0, \ldots, W_v, W_{v+1}, \ldots, W_u, W_{u+1}, \ldots, W_S],$$

where $n = \text{floor}(k_{i+}/(S+1))$

∵ NOTE THAT $k_{i+}$ IS KNOWN

- IN THE CASE OF $u < v$ $$T_{i-} = \underbrace{(W_{v+1} + \ldots + W_S) + (W_0 + \ldots + W_S) + \ldots + (W_0 + \ldots + W_S)}_{k_{i-}} + \underbrace{(W_0 + W_1 + \ldots + W_u)}_{(S+1) + (u-v)}$$

$$= [n, \ldots, n, n+1, n, \ldots, n]^t [W_0, \ldots, W_v, W_{v+1}, \ldots, W_u, W_{u+1}, \ldots, W_S],$$

where $n = \text{floor}(k_{i-}/(S+1))$

∵ NOTE THAT $k_{i-}$ IS KNOWN

FIG. 17A

IN THE CASE OF LEARNING DATA (1, 120, M2, M3, 49):
M2, M3 ARE ASCENDING ORDER
$n = \text{floor}(49/4) = 12$
$x1 = [12; 12, 12, 13], y1 = 320$

FIG. 17B

IN THE CASE OF LEARNING DATA (2, 160, M3, M1, 67):
M3, M1 ARE DESCENDING ORDER
$n = \text{floor}(67/4) = 16$
$x2 = [17; 17, 17, 16], y2 = 160$

FIG. 17C

IN THE CASE OF LEARNING DATA (3, 160, M1, M1):
M1, M1 ARE DESCENDING ORDER
$n = \text{floor}(68/4) = 17$
$x3 = [17; 17, 17, 17], y3 = 160$
:

FIG. 17D $$y = \begin{pmatrix} 120 \\ 160 \\ 160 \\ 170 \\ 320 \\ 90 \\ 130 \\ \vdots \end{pmatrix} \quad X = \begin{pmatrix} 12 & 12 & 12 & 13 \\ 17 & 17 & 17 & 16 \\ 17 & 17 & 17 & 17 \\ 17 & 17 & 18 & 18 \\ 34 & 34 & 34 & 33 \\ 10 & 9 & 9 & 10 \\ 14 & 13 & 13 & 14 \\ \vdots & & & \end{pmatrix} \begin{matrix} x1 \\ x2 \\ x3 \\ x4 \\ x5 \\ x6 \\ x7 \end{matrix}$$

PROGRAM EVALUATION APPARATUS AND PROGRAM EVALUATION METHOD

CROSS-REFERENCE TO RELATED APPLICATION

This application is based upon and claims the benefit of priority of the prior Japanese Patent Application No. 2008-260389 filed on Oct. 7, 2008, the entire contents of which are incorporated herein by reference.

FIELD

A certain aspect of the embodiments discussed herein relates to an evaluation of a program performance.

BACKGROUND

In the case of measuring a performance of a computer or a program, a trace method and a profiler method have been know as a method for investigating bottle necks in a computer or a program.

In the trace system, trace statements (a kind of print statements) are embedded before and after an interval in the program that the user wants to measure (hereinafter, measurement interval). By execution of the trace statement, executed times are obtained and a time lag of the execution time of each of the trace statement is calculated.

In the profiler method, an event interrupt is periodically generated during execution of the program. By the interruption, a value of a program counter at the point is obtained, and a ratio of the value of the program counter included in the measurement interval is calculated.

Note that a technique has been proposed in which an interruption is generated for every one order in a firmware that evaluates a performance of the program, the execution state of the order is simulated by the firmware, and performance information is collected.

Further, a technique has been proposed in which a transaction which should be processed is selected and state information is stored during when the transaction is processed by a function unit.

Further, a technique has been proposed in which order addresses for starting and finishing of measurement are set, and an execution time of the program is measured by integrating the vale obtained by subtracting an index time from the execution time for every one order of the interval.

Above techniques are disclosed in Japanese Laid-open Patent Publication No. 1-145736, Japanese Laid-open Patent Publication No. 11-272519, and Japanese Patent No. 3389745.

SUMMARY

According to an aspect of an embodiment, an apparatus for evaluating a performance of a program by embedding a plurality of trace statements, the apparatus including: a storage unit for storing the program embedded with the plurality of trace statements, each of the trace statements including a instruction for outputting trace records which identify time when and portions where the trace statements are executed in the program; a processor for evaluating the performance of the program in accordance with a process including: executing the program embedded with the plurality of trace statements cyclically and iteratively while selecting one or two of the trace statements at random for each cycle of executing the program wherein the instruction in the trace statements is activated so as to output a trace record and the instruction in the rest of the trace statements is deactivated so as not to output another trace record; calculating each time intervals required by the program to run through the section between adjacent two trace statements by statistically analyzing the outputted trace records; and evaluating the performance of the program on the basis of the time intervals.

The object and advantages of the invention will be realized and attained by means of the elements and combinations particularly pointed out in the claims.

It is to be understood that both the forgoing general description and the following detailed description are exemplary and explanatory and are not respective of the invention, as claimed.

BRIEF DESCRIPTION OF THE DRAWINGS

FIG. 2 is an illustration diagram of a program performance measurement processing that is executed in the program performance measurement device of FIG. 1.

FIGS. 4A, 4B and 4C are illustration diagrams of the program performance measurement processing.

FIGS. 5A and 5B are illustration diagrams of the program performance measurement processing in the case of using a trace counter.

FIG. 6 is a flowchart of the program performance measurement processing executed in the program performance measurement device of FIG. 1.

FIG. 7 is a flowchart of a trace data output processing that is executed in step S11 of FIG. 6.

FIG. 10 is a process flowchart of a hidden trace estimation processing that is executed in step S13 and an estimation processing of a processing time of a measurement interval that is executed in step S14 of FIG. 6.

FIG. 11 is an illustration diagram of the program performance measurement processing of FIG. 10.

FIGS. 12A, 12B, 12C and 12D are illustration diagrams of the program performance measurement processing of FIG. 10.

FIG. 13 is an illustration diagram of the program performance measurement processing of FIG. 10.

FIGS. 14A, 14B, 14C, 14D, 14E and 14F are illustration diagrams of the program performance measurement processing of FIG. 10.

FIG. 16 is an illustration diagram of the program performance measurement processing of FIG. 15.

FIGS. 17A, 17B, 17C and 17D are illustration diagrams of the program performance estimation measurement processing of FIG. 15.

DESCRIPTION OF EMBODIMENTS

Figure 1:
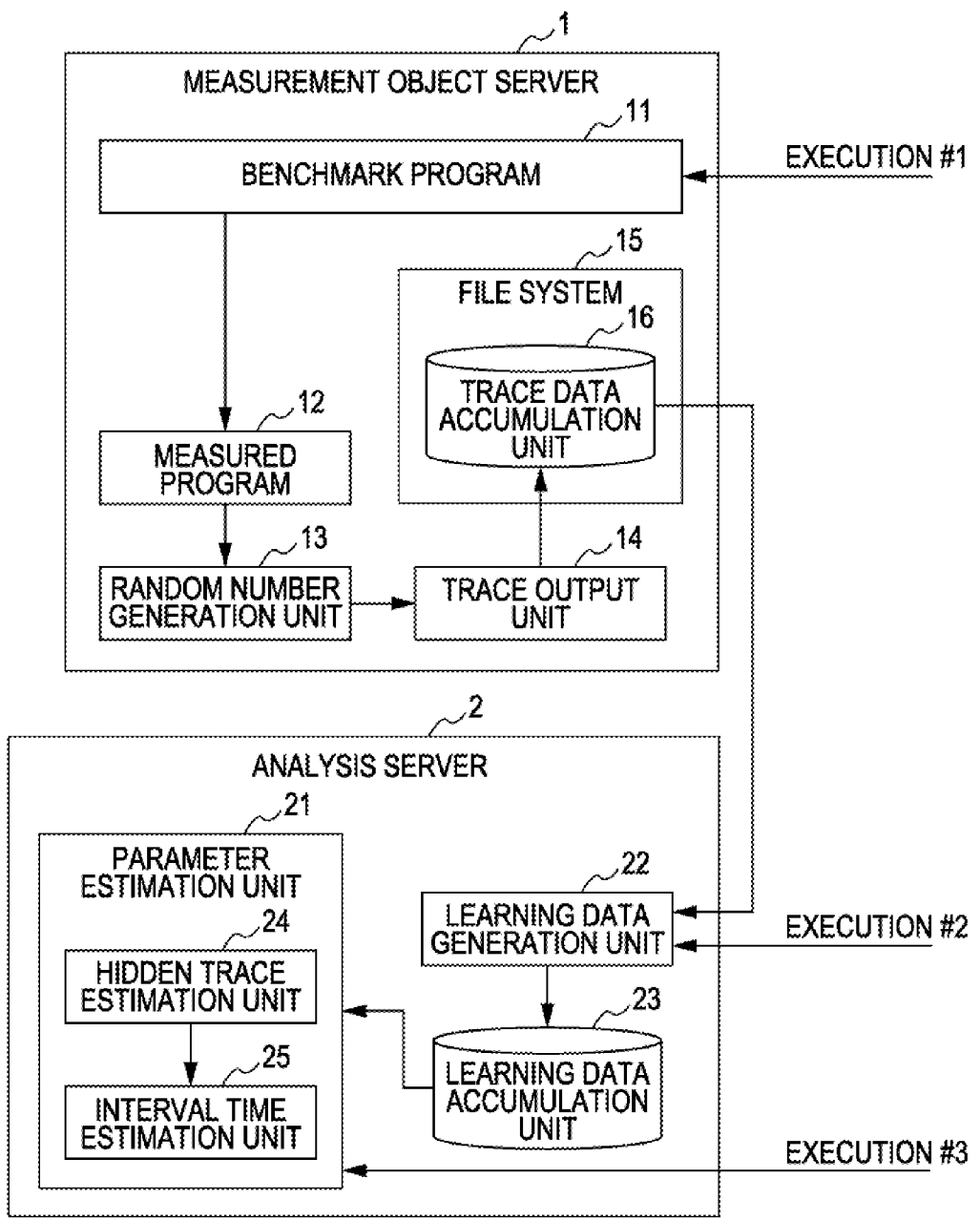
FIG. 1 is a configuration diagram showing an example of a program performance measurement device according to an embodiment of the invention.

FIG. 1 is a configuration diagram showing an example of a program performance measurement device according to an embodiment of the present invention.

The program performance measurement device 1 of the embodiment is equipped with a measurement object server 1 and an analysis server 2. The measurement object sever 1 is a computer that is a measuring object or a computer in which a program as a measurement object is executed. The analysis server 2 is a computer that analyzes a measurement result of the measurement object server 1.

The measurement object server 1 is equipped with a benchmark program 11, a measured program 12, a file system 15, a random number generation unit 13, and a trace output unit 14. The file system 15 is equipped with a trace data accumulation unit 16. Note that as concrete examples of the measured program, there are included an OS (operating system), a middleware, an application program, and the like.

The analysis server 2 is equipped with a parameter estimation unit 21, a learning data generation unit 22, and a learning data accumulation unit 23. The parameter estimation unit 21 is equipped with a hidden trace estimation unit 24 and an interval time estimation unit 25.

Note that the hidden trace unit 24 can be eliminated in the case where the execution number of a trace statement (a kind of print statement) is measured.

Further, the measurement object server 1 and the analysis server 2 may be provided as one server or computer.

The measurement object sever 1 generates a set of trace data. The measurement object server 1 generates a set of trace data by executing the benchmark program 11.

The benchmark program 11 is a program that is executed for applying the load a load for performance measurement. For example, the benchmark program 11 starts the execution when an instruction for executing the program (execution #1) is inputted.

A plurality of trace statements are preliminarily embedded in the measured program 12 as described below. By executing the trace statement, the trace data obtained by the execution of the measured program 12 is outputted to the file system 15.

The random number generation unit 13 is instructs the trace output unit 14 to output the trace data at random. The random number generation unit 13 generates a random number every time when executing the trace statement, and inputs the generated random number in the trace output unit 14. The random number will be described below with reference to FIG. 3A and FIG. 3B.

The trace output unit 14 outputs the trace data to the file system 15 in accordance with the output of the random number generation unit 13. The trace output unit 14 once writes the trace data in a memory when output of the trace data is required, and outputs the trace data to the file system 15 later as a whole. Herewith, a measurement result is to be not influenced by the output to the file system 15 as far as possible. The trace data will be described below with reference to FIG. 4A and FIG. 5A.

In the file system 15, the trace data is stored in the trace data accumulation unit 16 and is transmitted to the learning data generation unit 22 of the analysis server 2. Note that, when an instruction (execution #2) for generating learning data is input in the learning data generation unit 22, the learning data generation unit 22 reads out the trace data from the trace data accumulation unit 16 in response thereto.

The analysis server 2 calculates a necessary time for execution for a plurality of measurement intervals based on the set of the trace data from the measurement object server 1. The measurement interval is determined by a plurality of trace statements as describe below. The analysis server 2 calculates the necessary time by executing a predetermined statistical processing as for the set of the trace data.

The learning data generation unit 22 generates a set of the learning data based on the set of the trace data read from the trace data accumulation unit 16, and stores in the learning data accumulation unit 23. The learning data will be described below with reference to FIG. 4B and FIG. 5B.

Further, the learning data generation unit 22 generates a set of pair data from the set of the generated learning data and stores in the learning data accumulation unit 23. The pair data is generated by selecting two learning data having a predetermined relationship in the positions of the corresponding trace statements from the set of the learning data as described below with reference to FIG. 4C. Note that in the case of using a trace counter, it is not necessary to generate the pair data.

The learning data and the pair data is data for calculating a processing time of the measured program by a statistical processing described below. The learning data and the pair data of the learning data accumulation unit 23 is read by the parameter estimation unit 21.

When an instruction (execution #3) for calculating the processing time by the statistical processing is inputted, the parameter estimation unit 21 causes the hidden estimation unit 24 to execute a predetermined statistical processing by using the set of the pair data in response thereto. That is, the hidden trace estimation unit 24 reads out the learning data and the pair data from the learning data accumulation unit 23, estimates a hidden trace by the statistical processing, and transmits the estimated hidden trace to the interval time estimation unit 25. The statistical processing is executed by using the probability of not sequentially outputting the trace data as described below. Note that the processing in the hidden trace estimation unit 24 is not necessary when a trace counter is used.

The interval time estimation unit 25 estimates the processing time as for a processing interval in the measured program 12 which is a measurement object based on the learning data. When a trace counter is not used, the total processing time for all measurement intervals that is an output of the hidden trace estimation unit 24 is used in addition to the learning data. When a trace counter is used, only the learning data is used.

FIG. 2 and FIG. 3 are each an illustration diagram of a program performance measurement processing that is executed in the program performance measurement device of FIG. 1.

For example, assuming that the trace statements are embedded in the measured program 12 as shown in FIG. 12. Further, assuming that a function foo( ) is repeatedly called in the measured program 12 by execution of the benchmark program 11. When the function foo( ) is called, a function bar( ) and a function baz( ) are called. At this time, the time required for executing the function bar( ) is measured, and the time required for executing the function baz( ) called from the function bar( ) is also measured. Accordingly, trace statements are embedded at the positions shown by the labels of M0, M1, M2, M3 of FIG. 2. In this case, the trance sentences distinguished by the labels are executed in the order of M0, M1, M2, M3 for every calling of the function foo( ). At this time, a measurement interval W1 is determined as an interval in which a processor is passed through the program between the label M0 and label M1, and W1 shall be written as W1←(M0, M1). In the same manner, written as measurement interval W2←(M1, M2), measurement interval W3←(M2, M3). Further, a measurement interval W0 is an interval from the last label M3 to M0 that appears in the second time by calling of the subsequent function foo( ). That is, written as measurement interval W0←(M3, M0).

The above mentioned matters are formally defined. Any position of the measured program 12 shall be expressed by label Ms (s is integer from 0 to S). However, when the benchmark program 11 is executed, in the measured program 12, the processor shall be passed through the label Ms in the order of suffix s. At this time, the measurement interval is determined as Ws←(M(s−1), Ms) (in the case of 1≦s≦S), and W0←(MS, M0). Further, it is determined that when two labels u=Mi, v=Mj are ascending order, i<j is satisfied, and when descending order, i>j is satisfied.

Figure 3A:
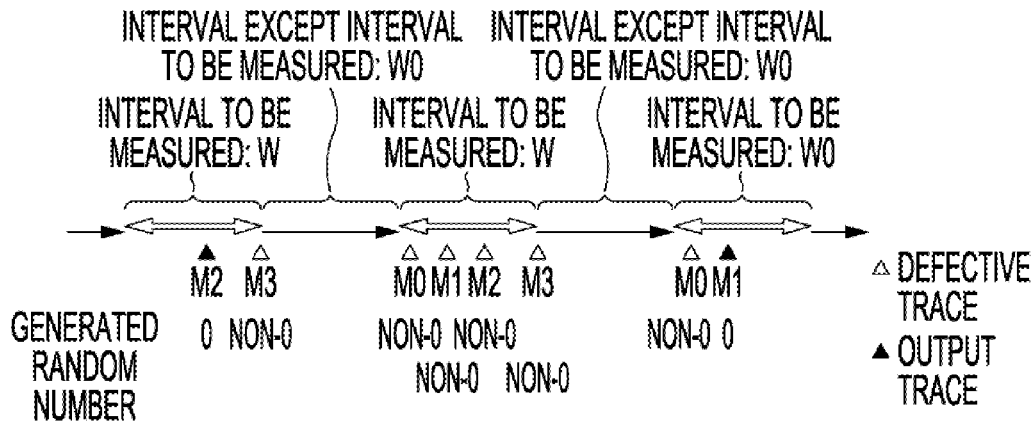
FIGS. 3A, 3B and 3C are illustration diagrams of the program performance measurement processing that is executed in the program performance measurement device of FIG. 1.
Figure 3B:
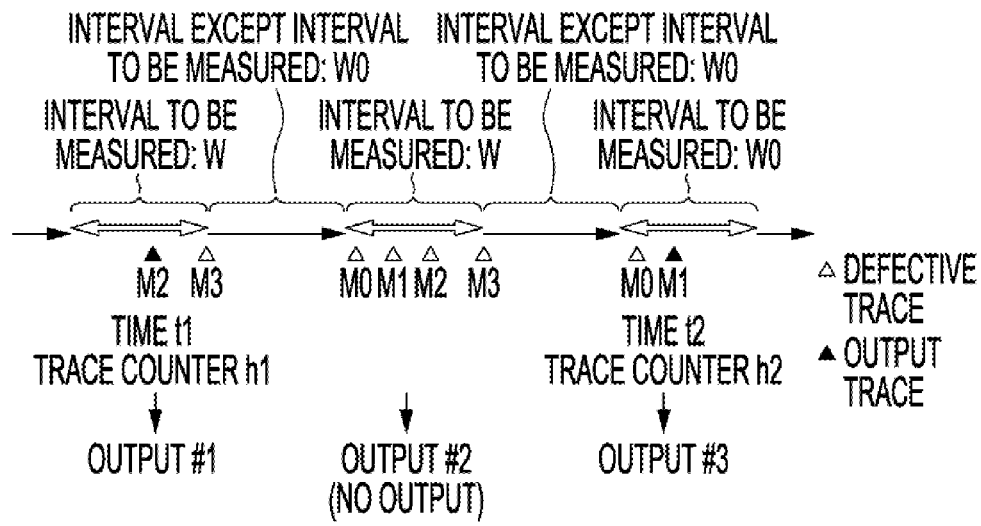

FIG. 3A and FIG. 3B are diagrams in which the labels on the program through which a processor is passed are plotted on a time axis when the measured program 12 is repeatedly driven by executing the benchmark program 11. Now, since measuring of the time required for executing the function bar( ) is the object, the measurement interval W in which the measurement intervals W1, W2, W3 are coupled and the interval W0 excluding the measurement interval Wi constitute one driving of the measured program 12. Since a trace statement is embedded at the position of each label, each trace statement shall be expressed by using the label. In the example, four trace statements are executed at the positions of the labels M0 to M3 in the measurement interval W. In the example, in the measurement interval W, four trace statements at the positions of the labels M0 to M3 are executed. Note that the labels M01 to M3 (that is, the trace statements at the positions) shall be expressed by triangles.

For example, in FIG. 3A, when the measured program 12 is driven and the trace statements are executed, the random number generation unit 13 generates a random number r and inputs the random number r in the trace output unit 14.

The value of the random number r shall be within the range of, for example, non negative integer N−1. For example, when the value of the random number r is 0, the trace output unit 14 outputs the trace data, and when the random number r is not 0, the trace output unit 14 does not output the trace data. When the random number r is a uniform random number and occurrence of each non negative integer N−1 is equally possible, trace data is to be randomly outputted only once every N times.

In FIG. 3A, when the trace statement is executed, the random number r is always generated. Among the random numbers generated when each trace statement (that is, portion of label) is executed in the first measurement interval W, assuming that only the random number of the trance sentence of the label M2 is "0", and the random numbers of the other labels such as M0 are "non-0" values that are not 0. In this case, the trace output unit 14 outputs only the trace data of the label M2 in the first measurement interval W, and does not output other trace data. In FIG. 3A and FIG. 3B, the trace statement (output trace) from which trace data is outputted is shown by a black triangle, and the trace statement from which trace data is not outputted (defective trace or hidden trace) is shown by a white triangle. In the case of not using a trace counter, the trace output unit 14 obtains the execution time t1 of the trace statement with the label M2 as a result of executing the trace statement of the label M2, and outputs t1 as output #1. In the case of using a trace counter, the trace output unit 14 further obtains the count value h1 (h2) of the trace counter (shown by trace counter h1 (h2) in FIG. 3B), and further includes this in outputted #1.

Then, assuming that the random number is "non 0" value except 0 as for every trace statement in the second measurement interval W. In this case, in the measurement interval W, any trace data is not output, and output #2 can not be obtained (or, made to blank).

Further, then, assuming that only the trace statement of label M1 is "0", and "non 0" value except 0 as for other label M0 and the like among the random numbers generated when executing each trace statement in the third measurement interval W. In this case, the trace output unit 14 outputs only the trace data of the label M1 in the measurement interval W. In the case of not using a trace counter, the trace output unit 14 obtains execution time t2 of the trace statement with the label M1, and outputs t2 as output #3. In the case of using a trace counter, the trace output unit 14 further obtains the count value h2 of the trace counter and also includes n2 in output #3.

Herein, the trace counter will be described. The trace counter is a counter in which a count value is increased by +1 for every time the trance sentence is executed. For example, in FIG. 3B, since the trance sentence is executed by 7 times during between output #1 and output #3, the count value is increased by h2−h1=7.

The case where trace data is not outputted or one trace data is outputted in one measurement interval W is described above. However, note that there is a case that plurality of trace data is outputted in one measurement interval W.

When the measurement program 12 is driven only once, the obtained trace data is not sufficient to estimate the measurement interval. For example, in FIG. 3A and FIG. 3B, only the trace data of the label M2 is obtained for the first measurement interval W. However, the measured program 12 is repeatedly driven, and in the process, the trace data output in accordance with the random number r is randomly selected. Then, by performing a statistical processing on the imperfect trace data, the defect of the trace data can be complemented.

Figure 3C:
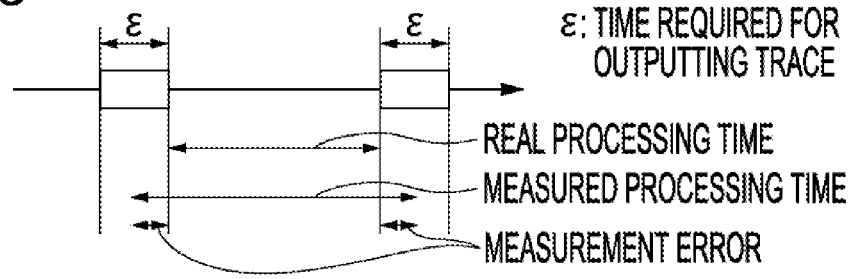

Note that, in order to output the trace data, a certain time is required as shown in FIG. 3C. Accordingly, it can not be avoided that error times ε are added to the actual processing time of the measurement interval. However, according to the method of the embodiment, the amount that the error caused by the execution of the trace statement is added to the processing time of the measurement interval can be reduced. For example, as shown in FIG. 3A, assuming that the trace data is output by two times when the measurement interval W including four trace statements is executed by three times, the influence of the error ε can be reduced to $2/12$.

Herewith, even when the segmented measurement interval W1 or the like is microscopic, the time for the execution can be measured with a high accuracy. Accordingly, a time for the microscopic (high speed) processing such as, for example, switching of processes, switching of a user application and kernel, or the like can be measured with a high accuracy. Further, since it is not necessary to always output the trace data when executing the trace statement, the time required for the high speed processing in a processor can be measured by using a low speed external device.

FIG. 4A shows an example of a set of the trace data outputted from the trace output unit 14 and accumulated in the trace data accumulation unit 16 in the case of not using a trace counter. FIG. 5A shows an example of a set of the trace data that is similarly accumulated in the case of using a trace counter.

The set of the trace data includes plurality of trance data. The trace data includes a time when the trace statement is executed and a label showing the position of the executed trace statement as shown in FIG. 4A and FIG. 5A. The time is expressed by an elapsed time from a reference point (time 0) (for example, nano second unit). Since only a time lag is concerned in the learning data, it does not mater that when the reference point of the time is. The label is information for specifying the executed trace statement.

When using a trance counter, in addition to the time and label as shown in FIG. 5A, the trace data includes a counter value by the trace counter (in the drawing, simply referred to as "trace counter"). The trace counter value is expressed by the execution number of the trace statement from the reference point as a certain time. Since only the hidden trace number is concerned in the learning data, it does not matter that when the reference point of the trace counter value is.

For example, as shown in FIG. 4A, at the time "1200", it can be understood that the trace statement of the label M2 is executed. In the case of using a trance counter, as shown in FIG. 5A, it can be understood that the trace counter value at the time was "1000". It can be similarly understood as for the other labels.

FIG. 4B shows an example of the set of the learning data output from the learning data generation unit 22 and accumulated in the learning data accumulation unit 23 in the case of not using a trace counter. FIG. 5B shows an example of the set of the learning data similarly accumulated in the case of using a trace counter.

The set of the learning data includes plurality of learning data. The learning data shows a time lag between the trace data. That is, in the case of not using a trace counter, the learning data includes a time lag Ti, a start label Bi, and an end label Ei as shown in FIG. 4B. In the case of using a trace counter, as shown in FIG. 5B, the learning data further includes a hidden trace number ki. The time lag Ti is a time lag between two trace data that are basis for generating the learning data. The start label Bi is a label formally executed among the two trace data (old execution time). The end label Ei is a label latterly executed among the two trace data (new execution time). Note that the number i is applied in arbitrary order. The hidden trace number ki is a difference of the trace counter values between two trace data that are basis for generating the learning data.

For example, the learning data of number 1 is generated from the first and second trace data of the set of the trace data of FIG. 4A and FIG. 5A. Accordingly, the time lag Ti is "120", the stat label Bi is M2, the end label Ei is M3, and the hidden trace number ki is "49". It can be similarly understood as for the other numbers.

FIG. 4C shows an example of the set of the pair data output from the learning data generation unit 22 and accumulated in the learning data accumulation unit 23 in the case of not using a trace counter. Note that the pair data is not accumulated in the case of using a trace counter.

The pair data is data which is constituted by pair of learning data in which the start label Bi and the end label Ei are mutually reversed in the set of the learning data of FIG. 4B. For example, in the set of the learning data of FIG. 4B, each of the leaning data of i=1 and the learning data of i=5, and the leaning data of i=6 and the learning data of i=7 is pair data. Note that in the case where the start label Bi and the end label Ei are the same, the learning data independently constitutes pair data. For example, when the learning data of i=3 independently constitute pair data.

The set of the pair data includes plurality of pair data. The pair data includes an index+, an index−, a time lag Ti±, a label v, and a label u as shown in FIG. 4C. Note that number i± is arbitrarily applied. The label v and the label u are two labels commonly owned by the pair of the learning data, and the label v and the label u are in ascending order. The index+ shows the number of FIG. 4B or FIG. 5B of the learning data whose start label is the label u and whose end label is the label v, and in the same manner, the index− shows the number of the learning data whose start label is the label v and whose end label is the label u. The pair data of the number i± shall be described as (i+, i−), and the index+ shall be described as i+, and the index− shall be described as i−.

Note that when a pair contains only a single learning data, the index− is defined as blank (nil). Further, the start label Bi and the end label Ei do not lose generality even when handled as descending order. In other words, even when the index+ is defined as blank (nil) and the start label Bi and the end label Ei are handled as ascending order, the same result is obtained. Since the number i in FIG. 4B and the number i± of FIG. 4C are arbitrarily applied, and the index+ and the index− are introduced for convenience of illustration, it may not be necessary to create the indexes. The time lag (Ti±) is the sum of time lag Ti of the two learning data constituting a pair.

For example, the pair data of number 4± is constituted by the learning data of i=6 and the learning data of i=7, and the time lag Ti± is "220", the label v and the label u are respectively M0 and M2, the index+ is number 6 of the learning data whose start label is label u (M2) and whose end label is the label v (M0), and the index− is number 7 of the learning data whose start label is label v (M0) and whose end label is the label u (M2).

Hereinafter, a program performance measurement processing in the program performance measurement device of FIG. 1 will be described in detail in accordance with a processing flowchart shown in FIGS. 6 to 10.

FIG. 6 is a flowchart of the program performance measurement processing that is executed in the program performance measurement device of FIG. 1.

When execution #1 is input by the user, execution of the benchmark program 11 is started. Herewith, the measured program 12 is repeatedly driven. In the process, a trace data is obtained, and the trace output unit 14 accumulates the trace data in the trace data accumulation unit 16 in accordance with a value of the random number (step S11). Herewith, the set of the trace data shown in FIG. 4A or FIG. 5A can be obtained. Step S11 will be described in detail with reference to FIG. 7.

When execution #2 is input by the user, the learning data generation unit 22 reads the set of the trace data from the trace data accumulation unit 16, and generates the learning data having the time lag Ti, start label Bi, end label Ei, between the successive trace data, and accumulates the learning data in the learning data accumulation unit 23 (step S12). Herewith, the set of the learning data shown in FIG. 4B or FIG. 5B can be obtained. Step S12 will be described in detail with reference to FIG. 8.

Next, in the case of not using a trace counter, the learning data generation unit 22 creates pair data from the learning data (step S13). Herewith, the set of pair data shown in FIG. 4C can be obtained. Step S13 will be described in detail with reference to FIG. 9. Note that step S13 is omitted in the case of using a trance counter.

When execution #3 is input by the user, the interval time estimation unit 25 calls the hidden trace estimation unit 24 and causes the hidden trace estimation unit 24 to execute a predetermined processing. That is, in the case of not using a trace counter, the hidden trace estimation unit 24 reads the set of the pair data from the learning data accumulation unit 23, and calculates the sum of the processing time required for the measuring interval and the processing time required for the interval except the measuring interval from these pair data (step S14). The sum can be calculated by using an expected value of the length of the successive traces which are not output due to using a random number.

Step S14 in the case of not using a trace counter will be described in detail with reference to FIG. 10.

Then, the interval time estimation unit 25 reads the set of the learning data from the learning data accumulation unit 23, and estimates the measurement interval and the interval except the measurement interval (step S15). Step S15 will be described in detail with reference to FIG. 10 and FIG. 15.

FIG. 7 is a flowchart of a trace data output processing that is executed in step S11 of FIG. 6.

The random number generation unit 13 generates the random number r (hereinafter, referred to as uniform random number r) (step S21). At the time, the value of the uniform random number r shall be an integer of not less than 0 and less than 1/q. Herein, q is a constant number within the interval of [0,1). For example, assuming that q=0.25, 1/q=4. That is, the random number r generates any of {0, 1, 2, 3} at the equivalent probability q=0.25. By using the uniform random number r, the trace can be output by the probability of once every 4 times.

The trace output unit 14 examines whether or not the uniform random number=0 (step S22). When the uniform random number=0, the trace output unit 14 outputs the trace data. That is, in the case of not using a trace counter, the trace output unit 14 records the present time and the label M of the executed trace statement in the trace data accumulation unit 16 as shown in FIG. 4A. On the other hand, in the case of using a trace counter, the trance output unit 14 also records the count value of the trace counter in addition thereto (step S23). Step S23 is omitted in the case where the uniform random number r=non-0 in step S22.

In the case of using a trace counter, the parameter estimation unit 21 increments the trace counter (step S24). In the case of not using a trace counter, S24 is not executed.

Figure 8:
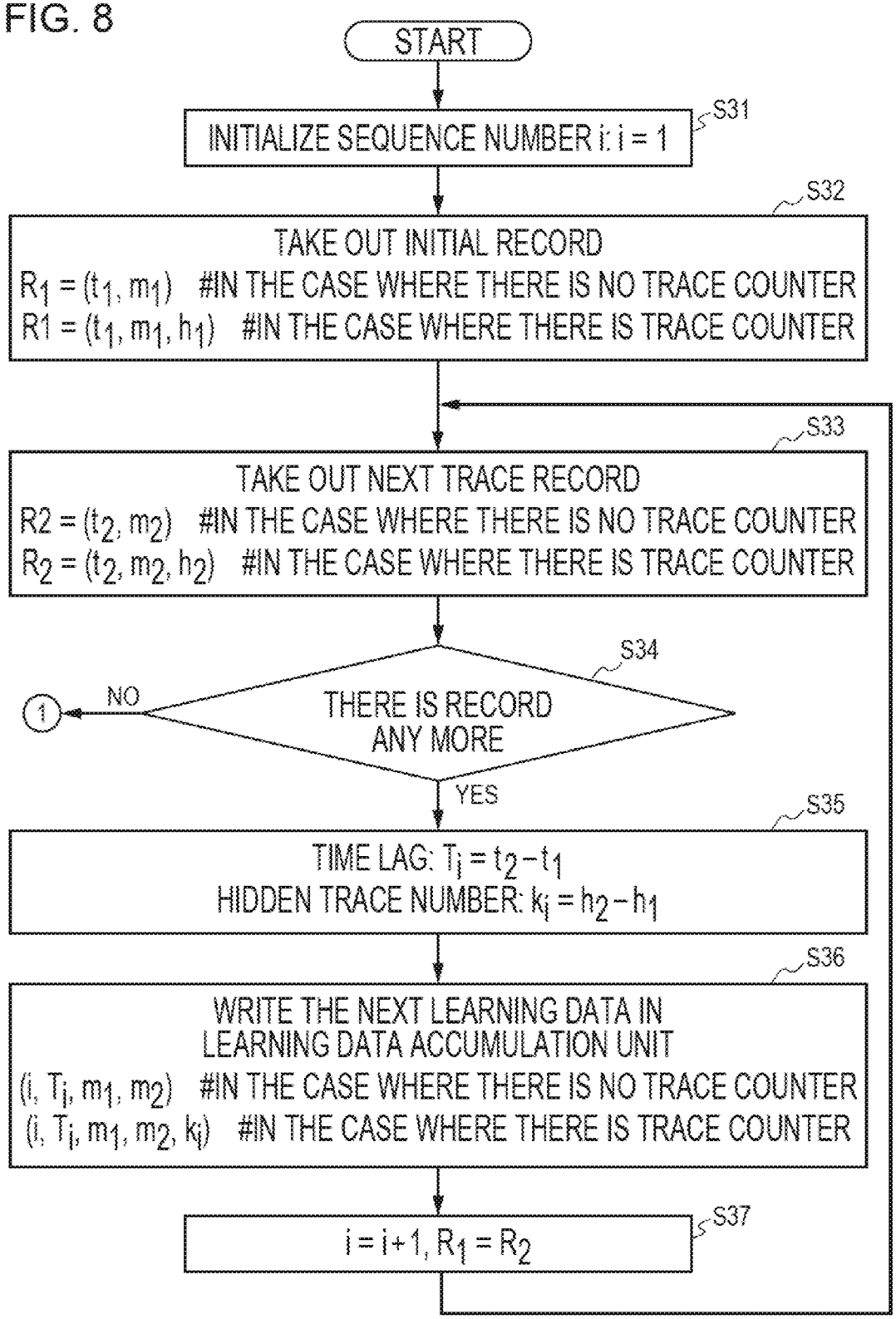
FIG. 8 is a flowchart of a learning data generation processing that is executed in step S12 of FIG. 6.

FIG. 8 is a flowchart of a learning data generation processing that is executed in step S12 of FIG. 6.

In FIG. 8, the learning data generation unit 22 initializes the sequence number (i), that is, number (i) in the learning data shown in FIG. 4B (step S31). That is, i=1.

Then, the learning data generation unit 22 takes out the initial (number 0) record (trace data) from the set of the trace data shown in FIG. 4A and FIG. 5A, and sets the record as R1 (step S32). In the case of not using a trace counter, R1=(t1, m1), and in the case of using a trace counter, R1=(t1, m1, h1). Further, the learning data generation unit 22 takes out the next (number 1) record from the set of the trace data, and sets the record as R2 (step S33). In the case of not using a trace counter, R2=(t2, m2), and in the case of using a trace counter, R2=(t2, m2, h2). Herein, t1 and t2 denote time, m1 and m2 denote the label M, and h1 and h2 denote the count values of the trace counter.

Then, the learning data generation unit 22 examines whether or not another record exists in the set of the trace data (step S34).

When there is another record (S34 Yes), the learning data generation unit 22 obtains the time lag Ti=t2−t1 and the hidden trace number ki=h2−h1 as for the taken out record R1 and record R2 (step S35), and writes the generated learning data in the learning data accumulation unit 23 as shown in FIG. 4B and FIG. 5B (step S36). The generated learning data is (i, Ti, m1, m2) in the case of not using a trace counter, and is (i, Ti, m1, m2, Ki) in the case of using a trance counter. Note that m1 is Bi and m2 is Ei in FIG. 4B and FIG. 5B.

Then, the learning data generation unit 22 sets the sequence number as i+1, and sets the record R2 as the new record R1 (step S37). Then, step S33 and the flowing steps are repeated.

Since the aforementioned processing of steps S33 to S37 is a generation processing of the learning data, the processing is common for the both of when not using a trace counter and when using a trace counter.

Figure 9:
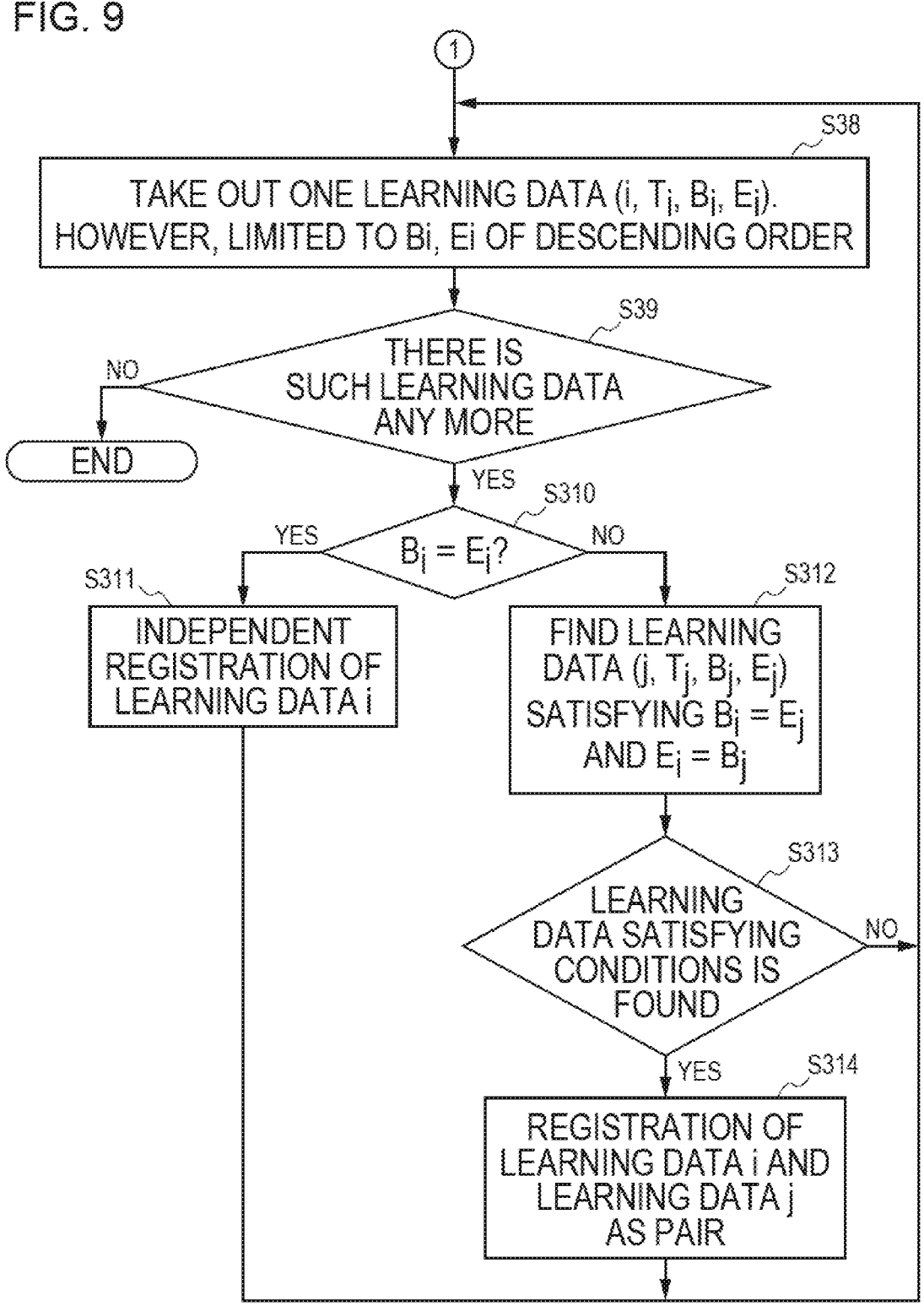
FIG. 9 is a flowchart of a learning data generation processing that is executed in step S12 of FIG. 6.

FIG. 9 is a flowchart of a pair data generation processing that is executed in step S13 of FIG. 6, and is executed only in the case of not using a trace counter, and is a processing that is not executed in the case of using a trace counter.

In the case where there is no another record in step S34 (S34 No), the learning data generation unit 22 takes out one learning data (i, Ti, Bi, Ei). However, in the example of FIG. 9, it is limited to the learning data whose Bi, Ei are descending order. (step S38). Then, the learning data generation unit 22 examines whether or not the learning data is absence (step S39). In the case where there is no such learning data, (S39 No) the processing is finished.

When there is another learning data (S39 Yes), the learning data generation unit 22 examines whether or not Bi=Ei as for the taken out learning data i (step S310).

In the case of Bi=Ei (S310 Yes), the learning data generation unit 22 sets the taken out learning data i as the pair data (i, nil) shown in FIG. 4C, and registers the pair data in the set of the pair data of the learning data accumulation unit 23 (step S311). This corresponds to the pair data which is the pair (3, nil) in the example of FIG. 4C.

In the case of not Bi!=Ei (S310 No), the learning data generation unit 22 searches the set of the learning data of FIG. 4B by using Bi and Ei of the taken out learning data, and finds the learning data (j, Tj, Bj, Ej) that satisfies Bi=Ej and Ei=Bj (step S312).

Then, the learning data generation unit 22 examines whether or not the learning data j matched with the conditions of step S312 is found (step S313). When the learning data is not found (S313 No), step S38 and the following steps are repeated. On the other hand, in the case where the learning data matched with the conditions of S312 is found (S313 Yes), the learning data generation unit 22 registers the learning data i and the found learning data j in the set of the pair data of the learning data accumulation unit 23 as the pair data (i, j) shown in FIG. 4C (step S314). The registered pair data corresponds to the par data except the par data which is the pair (5, 1) in the example of FIG. 4C.

FIG. 10 is a processing flowchart of a hidden trace estimation processing that is executed in step S13, a sum calculation processing of the processing time executed in step S14, and an estimation processing of the processing time of the measuring interval that is executed in step S15 of FIG. 6 in the case of not using a trace counter.

Before describing FIG. 10, a method for calculating the processing time of the measurement interval in the case of not using a trace counter will be described by using FIGS. 11 to 13.

First, FIG. 11 will be described. Assuming that there are (S+1) types of labels Ms (however, s is integer of 0 to S) of {M0, M1, . . . MS} in the measured program 12. Assuming that the processing time of the measuring interval (interval time) between the label M(s−1) and the label Ms is Ws (in the case of 1≦s≦S), the interval time between the label MS and the label M0 is W0. Accordingly, the purpose of the hidden trace estimation processing and the estimation processing of the processing time of the measurement interval described in FIG. 10 is to estimate the processing time Ws.

The learning data indicated by the index+ and the index− of the pair data of the number i± is (i+, Ti+, Bi+, Ei+) and (i−, T−Bi−, Ei−). Note that there are relations of u=Bi+=Ei− and v=Ei+=Bi− from the definition of the index. Herein, the time lags Ti+ and Ti− can be described as in FIG. 11 by using the processing time Ws of the measurement interval. However, in the case of not using a trace counter, the hidden trace numbers k+ and k− are unknown.

Since the hidden trance numbers k+ and k− are unknown, a device for obtaining the processing time Ws of the measurement interval is required without using the hidden trace numbers. Consequently, Z=W0+W1+ . . . +WS which is the total processing time of every measurement interval is estimated by adding the sum $Ti\pm=(Ti+)+(Ti-)$ of the time lag in the pair data to set π of every pair data as shown by calculation (i) and calculation (ii) of FIG. 11. The detail method is as shown in FIG. 11. As the conclusion, in order to calculate the total processing time Z of every measurement interval, the number of the types of the label (S+1), the size of the pair data set σ, the sum of the time lag of every pair data $\Sigma Ti\pm$, the expected value of the hidden trace number E[k] are required. The values can be easily calculated from the pair data except the expected value E[k] of the hidden trace number.

FIG. 12 is a calculation example of the expected value [k] of the hidden trace number in the case where a uniform random number r is used in the random number generation unit.

For example, as shown in FIGS. 12A and 12B, by using the provability p(k) of not sequentially outputting k number of traces, the expected value E[k] of the trace number can be theoretically calculated as shown in FIG. 12C. In this manner, the expected value E[k] of the trace number is expressed by using a parameter which is the provability q of outputting the trace. FIG. 12D shows a result of E[k] in accordance with the concrete values of q.

As described above, since the expected value E[k] of the hidden trance number can be calculated, the total processing time Z of every measurement interval can be estimated. Herein, the definition of the time lags Ti+ and Ti– of FIG. 11 will be described again.

FIG. 13 shows the definitional formulas shown in FIG. 11 again. Hereinafter, description is made in accordance with FIG. 13. As shown in FIG. 13, when the right sides thereof is ordered, it can be described so as to be divided into a constant term which is an integral multiple of the total processing time Z of every measurement interval and terms comprising variables Ws. What is import as the result is that the hidden trace numbers k+ and k– are not included any more. The row vector xi+ and xi– whose element is 0 or 1 showing presence or absence of the variable Ws in the right side can be created one by one from every learning data. Herewith, the regression formulas whose number is corresponding to the number of the learning data can be obtained, and by solving the regression formulas, Ws which is the processing time of the measurement interval can be calculated.

In FIG. 10, the hidden trace estimation unit 24 adds $Ti\pm$ to S for every pair (i+, i–) after initializing the value S to 0, (step S41). Further, Z=S/E[k] is obtained by the hidden trace estimation unit 24 (step S41). The processing is a processing for estimating Z which is the total processing time of every measurement interval described in FIG. 11 and FIG. 12.

The interval time estimation unit 25 takes out the learning data (i, Ti, Bi, Ei) (step S43), and searches whether or not there is no unprocessed learning data in the set of the learning data of the learning data accumulation unit 23 (step S44).

When there is unprocessed learning data (S44 No), the interval time estimation unit 25 obtains the values xi, yi, bi based on the aforementioned value Z for the taken out learning data (step S45), and thereafter repeats step S43 and the following steps. The processing is a processing for introducing the regression formula described in FIG. 13.

When there is no unprocessed learning data (S44 Yes), the interval time estimation unit 25 performs a multivariate regression analysis on $yi=(xi\cdot w)+bi$, and calculates the necessary time in the measurement interval (step S46). Herewith, the total processing time of every measurement interval of the measured program 12 can obtain and the necessary time for every measurement interval can be calculated based on the expected value of the number the trace data that is not sequentially output.

FIG. 14 is an illustration diagram showing a real processing shown in FIG. 10. Note that FIG. 14 shows an example of the processing of the data shown in FIG. 4.

As shown in FIG. 14A, in the case of q=1/24, E[k]=120 (calculated by FIG. 12C). Then, in step S41, as shown in FIG. 14B, the sum S of the time lag is obtained for the four pair data shown in FIG. 4C. Further, in step S42, as shown in FIG. 14B, total processing time Z of every measurement interval is obtained.

Then, in step S45, for example, the interval time estimation unit 25 obtains the regression formula $y1=(x1\cdot w)+b1$ for the learning data of number 1 as shown in FIG. 14C. Similarly, as shown in FIG. 14D, the regression formula $y2=(x2\cdot w)+b2$ for the learning data of number 2 is obtained, and as shown in FIG. 14E, the regression formula $y3=(x3\cdot w)+b3$ for the learning data of number 3 is obtained. The regression formula is similarly obtained for other pair data.

Then, the interval time estimation unit 25 obtains the result as shown in FIG. 14F based on the result of the processing shown in FIGS. 14C to E. Note that in FIG. 14F, as is understood from the comparing of the value y and FIG. 4B, the result is rearranged in the order of the learning data.

Then finally, the interval time estimation unit 25 performs a multivariate regression analysis on the result shown in FIG. 14F. Herewith, for example, a result such as W0=6 (unit time, same in the following) W1=1, W2=5, W3=2 can be obtained.

Figure 15:
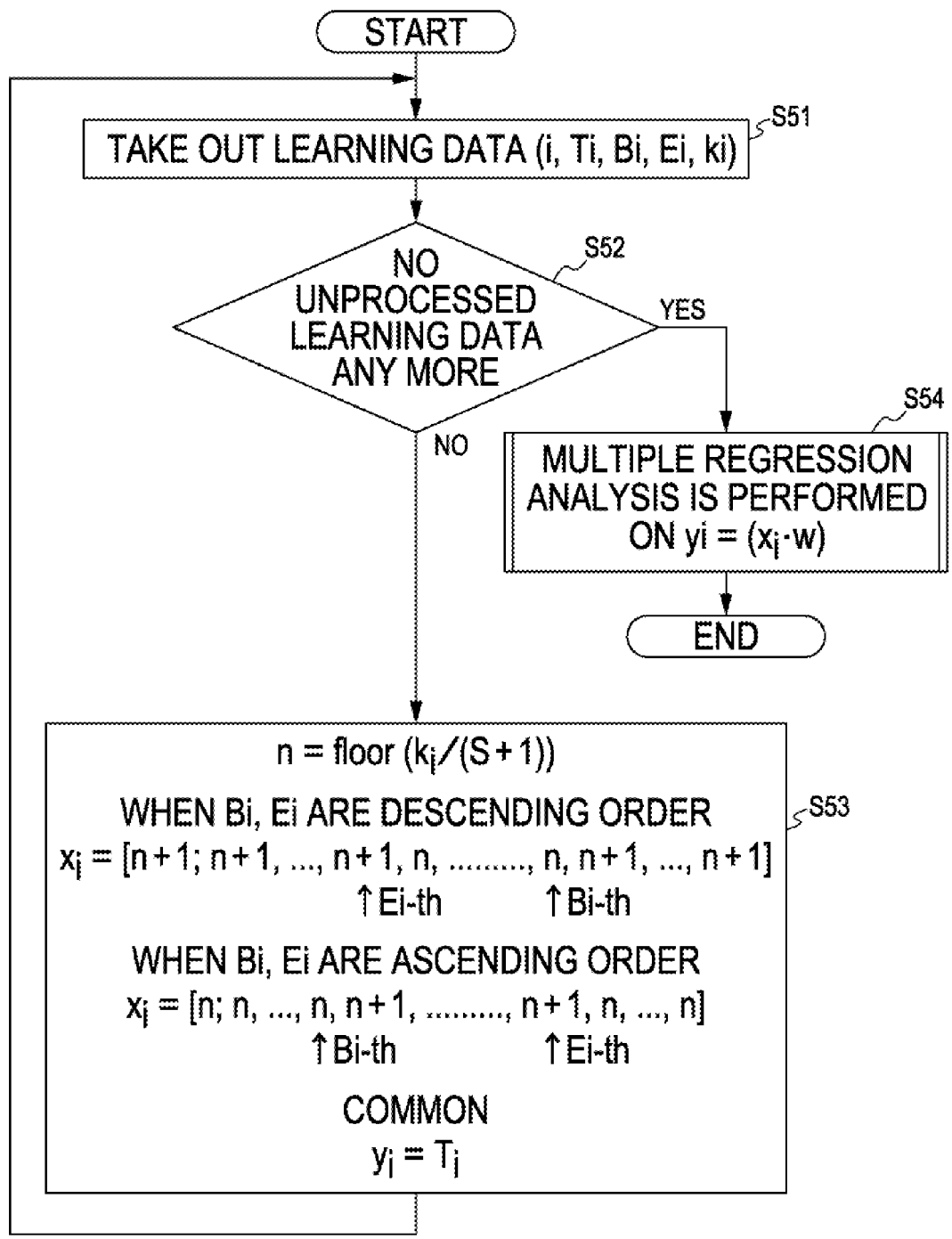
FIG. 15 is a process flowchart of the estimation processing of a processing time of a measurement interval that is executed in step S14 of FIG. 6 in the case of using a trace counter.

FIG. 15 is a processing flowchart of the estimation processing of the processing time of the measurement interval executed in step S15. Note that, as described above, in the case of using a trace counter, step S13 (hidden trace estimation processing) of FIG. 6 is omitted.

Before illustrating FIG. 15, a method for calculating the processing time of the measurement interval in the case of using a trace counter will be described by using FIG. 16.

In FIG. 16, the definition of the process time Ws of the measurement interval is the same as FIG. 11 and FIG. 13. The purpose of the estimation processing of the processing time of the measurement interval illustrated in FIG. 15 is to estimate the processing time Ws also in the case of using a trace counter.

The point that time lags Ti+ and Ti– in the learning data (i+, Ti+, Bi+, Ei+, ki+) and (i–, Ti–, Bi–, Ei–, ki–) are written by using the processing time Ws of the measurement interval is also similar to FIG. 11. However, in the case of using a trace counter, the hidden trace numbers k+ and k– are known.

Since the hidden trace is known, the regression formula can be created by using the hidden trace. As shown in FIG. 11, row vectors xi+ and xi– showing the number of times that each variable Ws appears in the right side of the former formula can be created one by one from every learning data by using the hidden trace numbers ki+ and ki–. Herewith, the regression formula whose number is corresponding to the number of the leaning data is obtained, and the processing time Ws of the measurement interval can be calculated by solving the regression formula.

In FIG. 15, the interval time estimation unit 25 takes out the learning data (i, Ti, Bi, Ei, ki) (step S51), and examines whether or not there is no unprocessed learning data in the set of the learning data of the learning data accumulation unit 23 (step S52).

When there is unprocessed learning data, the interval time estimation unit 25 obtains the values xi, yi, bi for the taken out learning data (step S53), and then, repeats the step S51 and the following steps.

When there is no unprocessed data, the interval estimation unit 25 performs a multivariate regression analysis on $yi=(xi\cdot w)$ and calculates the necessary time in the measurement interval (step S54). Herewith, the necessary time for every measurement interval of the measured program 12 can be calculated based on the hidden trace number that is the number of the trace data that is not sequentially output.

FIG. 17 is an illustration diagram showing a real processing shown in FIG. 15. Note that FIG. 17 shows an example of a processing of the data shown in FIG. 5.

In step S53 of FIG. 15, the interval time estimation unit 25 obtains the regression formula y1=(x1·w) for the learning data of number 1 as shown in FIG. 17A. Similarly, the regression formula y2=(x2·w) for the learning data of number 2 is obtained as shown in FIG. 17B, and the value y3=(x3·w) for the learning data of number 3 is obtained as shown in FIG. 17C. The regression formula for other pair data is similarly obtained.

Then, finally, the interval time estimation unit 25 obtains the result such as, for example, W0=6, W1=1, W2=5, W3=2 by performing a regression analysis on the result shown in FIG. 17D.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. An apparatus comprising:
    a storage configured to store a program embedded with a plurality of trace statements, each of the trace statements including an instruction for outputting trace records which identify time when and portions where the trace statements are executed in the program; and
    a processor configured to:
        execute the program iteratively while selecting one or two of the trace statements at random for each cycle of executing the program wherein the instruction in the trace statements is activated so as to output a trace record and the instruction in the rest of the trace statements is deactivated so as not to output another trace record,
        calculate each time intervals required by the program to run through the section between adjacent two trace statements by statistically analyzing the outputted trace records,
        evaluate a performance of the program on the basis of the time intervals; and
        generate a set of learning data on the basis of the set of the outputted trace records and identify pairs of learning data of the programs, each of the pairs having the same position or two different positions of the trace statements designated as a start and an end trace statements for one of the each of the pairs and designated as an end and a start trace statements for the other of the each of the pairs of execution cycles, respectively.

2. The apparatus according to claim 1, wherein the program includes intervals which is evaluated and other intervals which continues the intervals and is not evaluated.

3. The apparatus according to claim 1, wherein the processor is configured to:
    calculate each time intervals by summing up time intervals of the each of the pairs of execution cycles, respectively and calculating total time for the program execution cycle, and
    evaluate the performance of the program on the basis of information of the summed up time intervals.

4. The apparatus according to claim 1, wherein the processor is configured to output trace records which identify time when and portions where the trace statements are executed and, together with time, the number of times they are executed so far.

5. The apparatus according to claim 1, wherein the processor is configured to count the number of total time interval in the learning data, the total time interval being indicative of evaluating intervals in the program for one executing cycle.

6. A method of evaluating a performance of a program by embedding a plurality of trace statements, the method comprising:
    executing the program embedded with the plurality of trace statements iteratively, each of the trace statements including a instruction for outputting trace records which identify time when and portions where the trace statements are executed in the program, while selecting one or two of the trace statements at random for each cycle of executing the program wherein the instruction in the trace statements is activated so as to output a trace record and the instruction in the rest of the trace statements is deactivated so as not to output another trace record;
    calculating each time intervals required by the program to run through the section between adjacent two trace statements by statistically analyzing the outputted trace records;
    evaluating the performance of the program on the basis of the time intervals; and
    generating by a processor, a set of learning data on the basis of the set of the outputted trace records and identify pairs of learning data of the programs, each of the pairs having the same position or two different positions of the trace statements designated as a start and an end trace statements for one of the each of the pairs and designated as an end and a start trace statements for the other of the each of the pairs of execution cycles, respectively.

7. The method according to claim 6, wherein the program includes intervals which is evaluated and other intervals which continues the intervals and is not evaluated.

8. The method according to claim 6, wherein the calculating calculates each time intervals by summing up time intervals of the each of the pairs of execution cycles, respectively, and the calculating total time for the program execution cycle, and the evaluating evaluates the performance of the program on the basis of information of the summed up time intervals.

9. The method according to claim 6, further comprising:
    outputting trace records which identify time when and portions where the trace statements are executed and, together with time, the number of times they are executed so far.

10. The method according to claim 6, further comprising:
    counting the number of total time interval in the learning data, the total time interval being indicative of evaluating intervals in the program for one executing cycle.

* * * * *